Sept. 11, 1956            A. QUINCHE ET AL            2,762,421
APPARATUS FOR HEAT SEALING THE OPEN END OF FLEXIBLE
THERMOPLASTIC TUBING
Filed April 13, 1954
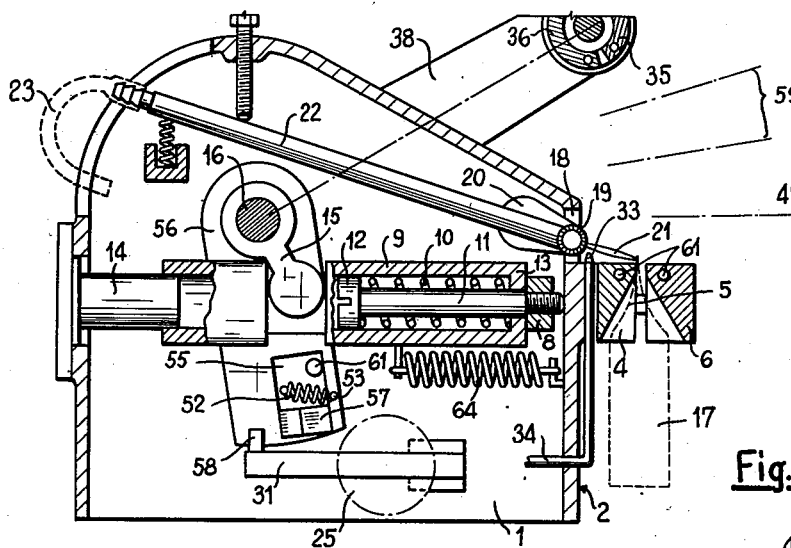
Fig. 1.
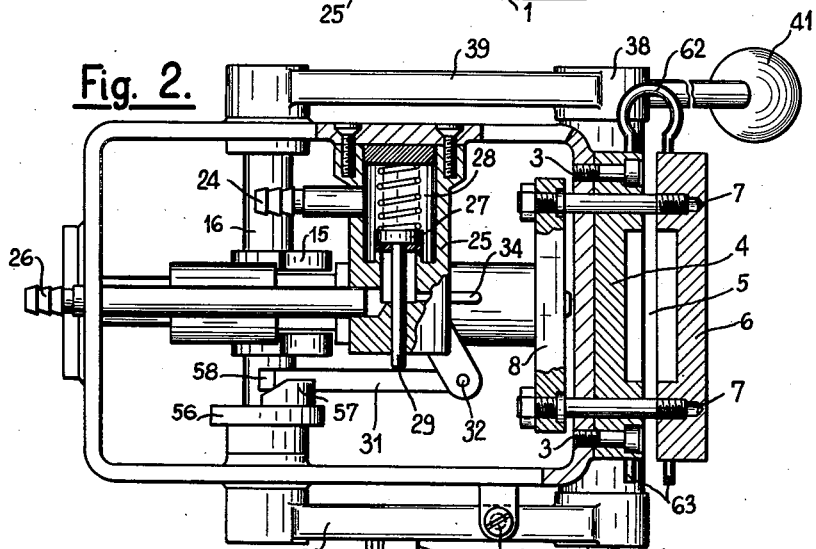
Fig. 2.
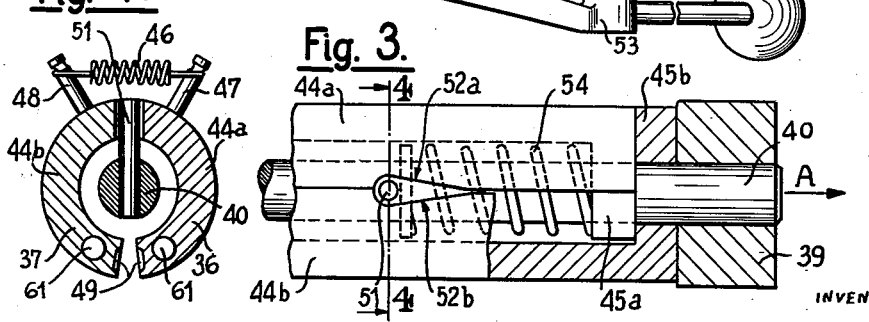
Fig. 4.
Fig. 3.
INVENTORS
ALBERT QUINCHE and
EDOUARD LECLUYSE
BY Cushman, Darby & Cushman
ATTORNEYS United States Patent Office 2,762,421
Patented Sept. 11, 1956

2,762,421

APPARATUS FOR HEAT SEALING THE OPEN END OF FLEXIBLE THERMOPLASTIC TUBING

Albert Quinche, St.-Sulpice, and Edouard Lecluyse, Vevey, Switzerland

Application April 13, 1954, Serial No. 422,957

Claims priority, application Switzerland May 1, 1953

14 Claims. (Cl. 154—42)

The object of the present invention is a machine to shut the end of flexible tubes in thermoplastic material comprising pincers to tighten the tube near its end to flatten it and get the edge of its opening to form two overlapping rims exceeding said pincers, means of heating said rims to weld them together by fusion and means of pressure liable to be applied on the welding obtained so as to hasten its cooling off upon their contact.

According to the preferred execution of the machine, said means of pressure comprise two jaws to tighten the welding.

These and other objects of the invention will be more fully apparent from the drawings annexed hereto, a description of which follows.

Fig. 1 is a vertical section.
Fig. 2 is a view from underneath, partly sectional.
Fig. 3 is a detail view, on a larger scale.
Fig. 4 is a sectional view according to line 4—4 of Fig. 3.

The machine represented comprises a frame 1 on the front surface 2 of which is fixed, with screws 3, the stationary jaw 4 of pincers 5 whose movable jaw 6 is supported by two rods 7 sliding in holes made in stationary jaw 4 and which are bolted to the ends of a cross-bar 8 placed in frame 1. This cross-bar is connected to a casing 9, which is also placed in that frame, by a yieldable coupling constituted by a spring 10 disposed around the stem of a screw 11 slidable in the boring of that casing and which rests, on the one hand, against the head 12 of that screw and, on the other hand, on the bottom 13 of the front end of casing 9. The casing 9 is supported at its rear end by a pivot 14 integral with a cover on which it may slide when shifted axially with a fork 15 which is integral with a transversal axis 16 pivoted into bearings on the lateral sides of frame 1, for controlling the closing of pincers 5. The latter closes the tube to be shut, shown in dotted lines at 17 (see Fig. 1), near its end, to flatten it and move the edge of its opening to form two rectilineal overlapping rims, extending above the pincers 5, the yieldable coupling constituted by spring 10 allowing casing 9 to continue its withdrawal under the action of fork 15, even when pincers 5 are closed.

Above pincers 5, frame 1 has an aperture 18 in which is placed a gas row 19 in which several holes are perforated to produce a row of parallel flames such as the one shown at 21, directed in such a manner as to secure the direct heating of the terminal part of tube 17 above the pincers 5 in view of heating the overlapping rims formed by the edge of the flattened opening of the tube to weld them by fusion of the material. This row 19, pivoted on frame 1 with end wings such as the one shown in 20 to allow the adjustment of its orientation, is fed by a tube 22 connected by a flexible tube 23 to the outlet coupling 24 of a slowed down plug 25 whose inlet plug is to be connected to the network is shown at 26. This plug has a valve 27 maintained against its seat by a spring 28 provided with a rod 29 that is pushed back by a lever 31 pivoted at 32 to arm on plug 25. The feeding of gas row 19 is interrupted in the closed position of valve 27 shown in Fig. 2, and only a slowed down burner 33 (see Fig. 1) supplied directly from the back chamber of plug 25 through a duct 34, remains alight, the feeding of the gas row being secured only when lever 31 is operated by a mechanism which will be described later on.

The machine represented includes a pair of jaws 36 and 37 to tighten down the welding. These jaws 36 and 37 are mounted on a support 38, movable with regard to pincers 5, and formed of two spaced arms 39 keyed on the ends of transversal axis or shaft 16 and which are connected at their free ends, by an axis or shaft 40 constituting a pivot for jaws 36 and 37. The support 38 has a control handle 41 and may be lowered at will from its rear position shown in Fig. 1 to a front position near to pincers 5 (indicated by broken line 42 in Fig. 1) determined by an adjustable stop 43 limiting its displacement, front position for which pincers 35 are capping the rear end of the tube placed in pincers 5.

As they are shown in Figs. 3 and 4, jaws 36 and 37 have a median part, respectively 44a and 44b of cross section, in the form of a sector with an aperture slightly less than 180° and end claws, respectively 45a and 45b through which they are pivoted on axis 40. A spring 46 placed between pegs 47 and 48 which they hold tends to maintain them in the opening position of the pincers shown in Fig. 4, the jaws being then against one another with their upper and lower faces provided with grooves 49 destined to be a recess for the bead formed by the welding being slightly spread open.

Shaft 40 is sliding in arms 39 and in claws 45a 45b of jaws, and has a peg 51 going through upper faces of jaws 36 and 37, in a hollow constituted by notches 52a and 52b made in those faces which present such a shape that the axial displacement of shaft 40 in the direction of arrow A of Fig. 3 causes the rotation in the opposite direction of jaws 36 and 37 and thus the closing of pincers 35, the jaws resuming their initial open position under the action of spring 46 when shaft 40 returns to its initial position.

A control lever 53 pivoted at 54 to one of the pivotal arms 39 (see Fig. 2) allows to move at will shaft 40 against the action of a return spring 54 which encircles it (see Fig. 3) in view of closing pincers 35.

The mechanism already mentioned ensuring the control of plug 25 comprises a cam 55 held by an arm 56 keyed on shaft 16 which presents a lateral shoulder 57 inclined on its front face, which cooperate with a pin 58 provided on the end of control lever 31.

At the time support 38 moves down, when going into sector indicated at 59 in Fig. 1, the shoulder 57, pushes back control lever 31 and thus ensures the feeding of gas row 19, this feeding being again interrupted when the cam passes on the other side of pin 58 before support 38 withdraws, the back face of shoulder 57 of cam 55 is stopped by pin 58 and cam 55 pivoted at 61 on arm 56 disappears against the action of a spring 52 which tends to maintain it against a stopping peg 53, and passes onto the other side of pin 58 without operating lever 31.

Due to the disappearing of cam 55 when arm 56 effects its return motion, gas row 19 is lighted only when support 38 comes down and remains out when the latter resumes its upper position.

There remains to mention that jaws 4 and 6 of pincers 5 and 36 and 37 of pincers 35 are equipped with ducts 61 provided for the passage of water destined to their cooling off, flexible couplings such as that shown in 62 in Fig. 2, securing the passage of water from one jaw to the other and inlet and outlet couplings such as those shown in 63 being destined to the connection of these ducts to the distributing network.

The machine represented is used as follows:

The operator introduces the end of the closing tube into pincers 5 then sets in motion handle 41 to lower support 38, the result of which is first to close pincers 5 then, when the support reaches sector 59 of its trajectory to light the gas row 19.

After remaining in this sector the time necessary for the fusion welding of the end edges of tube, the operator lowers support 38 unto its lower position, the effect of which is to interrupt the feeding of row 19, then puts in motion lever 53 to close pincers 35 on the welding, to grip the latter and thus ensures its cooling off and its rapid setting when in contact with the jaws of those pincers.

When the welding is sufficiently cooled off, the operator opens pincers 35 by releasing lever 53 and loosening handle 41 of support 38 which returns to its initial position under the action of spring 64 which brings casing 9 back to its front position shown in Fig. 1, for which pincers 5 are opened.

It is to be noted that gas row 19 operates only when support 38 comes down, due to the disappearing of control cam 55 of plug 25 upon its return and that the tightening of the tube in pincers 5, the lighting of gas row 19 and its slowing down are automatically controlled when support 38 is lowered, the result of which is to bring pincers 35 in working position.

The heating by a jet of hot gas (bright flame in the machine represented or hot air for instance in a modification allows one to obtain a good fusion welding of the flexible tubes are made of polyethylene which is usually utilized and the use of cold pincers to cool off the welding on its contact allows not only to hasten the stabilization of the welding, but also to regulate the bead formed and thus improve the homogeneity and aspect of the welding.

What we claim is:

1. The method of heat sealing the open end of a flexible container of thermoplastic material comprising enclosing the said open end to form a sealing area, heating the sealing area to fuse the material thereof into substantially the form of a bead, and thereafter compressing the bead into a homogeneous mass while cooling the same.

2. The method of claim 1 wherein the compressed bead is subjected to a further cooling stage after compression and initial cooling.

3. The method of claim 1 wherein the thermoplastic material is polyethylene.

4. Apparatus for heat sealing the open end of a flexible container of thermoplastic material comprising a frame, a first pair of jaws mounted on said frame for flattening the said open end to form a sealing area, means for heating said area to fuse the material thereof into substantially the form of a bead, a second pair of jaws mounted on said frame, said pairs of jaws being movable with respect to each other so as to dispose said second pair of jaws into engagement with said bead to compress the same into a homogeneous mass, and means for cooling said second pair of jaws so as to cool said bead during the compression thereof.

5. Apparatus as claimed in claim 4 in which said first pair of jaws are provided with ducts for the circulation of a cooling fluid.

6. Apparatus as claimed in claim 4 in which said cooling means comprises ducts for the circulation of a cooling fluid.

7. Apparatus for heat sealing the open end of a flexible container of thermoplastic material comprising a frame, a first pair of jaws and a second pair of jaws, said second pair of jaws being movable towards and away from said first pair of jaws, means responsive to the movement of said second pair of jaws towards said first pair of jaws to close said first pair of jaws and flatten the said open end to form a sealing area, heating means, means responsive to the movement of said second pair of jaws towards said first pair of jaws for actuating said heating means to fuse the material of said sealing area into substantially the form of a bead, means for moving said second pair of jaws together when the latter have been moved into engagement with said bead to compress the same into a homogeneous mass, and means for cooling said second pair of jaws so as to cool said bead during the the compression thereof.

8. Apparatus as claimed in claim 7 wherein said cooling means comprises ducts for the circulation of a cooling fluid.

9. Apparatus as claimed in claim 7 wherein said second pair of jaws are mounted for movement towards and away from said first pair of jaws by means of a pair of spaced arms pivotally mounted on said frame.

10. Apparatus as claimed in claim 9 wherein said second pair of jaws comprises a pair of complementary substantially semi-cylindrical parts rotatably mounted between said arms, said parts having a first pair of facing ends for engaging said bead and a second pair of facing ends spaced from said first pair of said ends for engagement by said means for moving said second pair of jaws together.

11. Apparatus as claimed in claim 10 wherein said means for moving said second pair of jaws together comprises a shaft upon which said parts are rotatably mounted, said shaft being axially movable with respect to said parts, and means on said shaft operable in response to relative axial movement of said shaft for engaging said second pair of facing ends and moving said first pair of facing ends together to compress said bead.

12. The method of heat-sealing the open end of a fusible thermoplastic container which includes introducing the open end portion of the container between spaced jaws, closing the jaws to form a flat sealing area and an exposed end portion above the jaws, heating the exposed end portion of the container so as to fuse the same into a bead, interrupting the heating of the container, compressing the bead into a homogeneous mass, and simultaneously cooling the homogeneous mass during the compression thereof so as to permanently join the sealing edges of the container together.

13. The method of heat-sealing the open end of a fusible thermoplastic container which includes introducing the open end portion of the container between spaced jaws, closing the jaws to form a flat sealing area and an exposed end portion above the jaws, heating the exposed end portion of the container so as to fuse the same into a bead, interrupting the heating of the container, compressing the bead into a homogeneous mass, simultaneously cooling the homogeneous mass during the compression thereof so as to permanently join the sealing edges of the container together, and further cooling the sealed edges after compressing and initially cooling the same.

14. Apparatus as claimed in claim 4, in which said means for heating include a gas row with at least one jet of hot gas disposed to secure direct heating of the sealing area.

References Cited in the file of this patent

UNITED STATES PATENTS

| | | |
|---|---|---|
| 2,281,187 | Waters | Apr. 28, 1942 |
| 2,326,931 | Dalton et al. | Aug. 17, 1943 |
| 2,606,850 | Piazze | Aug. 12, 1952 |
| 2,660,219 | Hass et al. | Nov. 24, 1953 |
| 2,682,910 | Piazze | July 6, 1954 |
| 2,697,474 | McGinley | Dec. 21, 1954 |
| 2,715,087 | Barradas | Aug. 9, 1955 |
| 2,720,247 | Richens | Oct. 11, 1955 |